(12) United States Patent
Hwang et al.

(10) Patent No.: US 12,146,780 B1
(45) Date of Patent: *Nov. 19, 2024

(54) REAL-TIME REPORTING AND ESTIMATING OF MASS OF VEHICLES USING DRIVE CHARACTERISTICS

(71) Applicant: Motiv Power Systems, Inc., Foster City, CA (US)

(72) Inventors: Tai-Sik Hwang, Foster City, CA (US); Justin Tomlin, San Francisco, CA (US); Elias Stein, San Francisco, CA (US); James Michael Castelaz, Alameda, CA (US)

(73) Assignee: Motiv Power Systems, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/367,150

(22) Filed: Sep. 12, 2023

Related U.S. Application Data

(63) Continuation of application No. 16/192,147, filed on Nov. 15, 2018, now Pat. No. 11,754,434.

(Continued)

(51) Int. Cl.
  *G01G 19/08* (2006.01)
  *B60W 40/076* (2012.01)
  (Continued)

(52) U.S. Cl.
  CPC ......... *G01G 19/022* (2013.01); *B60W 40/076* (2013.01); *G01G 19/08* (2013.01); *G07C 5/08* (2013.01)

(58) Field of Classification Search
  CPC ........ G01G 19/022; G01G 19/08; G07C 5/08; B60W 40/076
  See application file for complete search history.

(56) References Cited

U.S. PATENT DOCUMENTS

| 3,225,180 A | 12/1965 | Zorena | G01G 19/18 104/174 |
| 3,942,625 A | 3/1976 | Snead | G01G 11/04 198/810.01 |

(Continued)

*Primary Examiner* — Randy W Gibson
(74) *Attorney, Agent, or Firm* — Adibi IP Group, PC; Amir V. Adibi; Andrew C. Palmer

(57) ABSTRACT

A vehicle includes a vehicle mass estimator circuit. The vehicle mass estimator circuit is configurable to estimate a mass of vehicle during real-time operation of the vehicle without employing a scale or dedicated mass sensing system. The vehicle mass estimator circuit generates the vehicle mass $M_v$ from: (1) an estimated torque or sensed torque, (2) an estimated motor angular velocity or sensed motor angular velocity, and (3) sensed acceleration or without any sensed acceleration. In one embodiment, the vehicle mass estimator circuit senses motor current during vehicle operation and estimates a mass of the vehicle using the motor current without any dedicated acceleration sensor such as an accelerometer. A motor angular velocity is estimated from the motor current. In another embodiment, the vehicle mass estimator circuit senses motor current during vehicle operation and estimates a mass of the vehicle using the motor current and acceleration information provided by an accelerometer.

20 Claims, 12 Drawing Sheets

FORCES EXPERIENCED BY ELECTRIC VEHICLE ON UPWARD SLOPED SURFACE

Related U.S. Application Data

(60) Provisional application No. 62/586,886, filed on Nov. 15, 2017.

(51) Int. Cl.
  *G01G 19/02*  (2006.01)
  *G07C 5/08*  (2006.01)

(56) References Cited

U.S. PATENT DOCUMENTS

| | | | |
|---|---|---|---|
| 4,053,742 A | 10/1977 | Halase, III | G01G 9/00 702/44 |
| 4,548,079 A | 10/1985 | Klatt | B60W 40/13 73/862.192 |
| 4,677,579 A | 6/1987 | Radomilovich | E02F 9/26 73/862.56 |
| 5,215,154 A | 6/1993 | Kirby | G01G 19/03 177/25.14 |
| 5,321,637 A | 6/1994 | Anderson | G01G 19/14 701/50 |
| 5,393,939 A | 2/1995 | Nasuta, Jr. | G01G 19/03 177/210 R |
| 5,994,650 A | 11/1999 | Eriksson | B66F 9/22 361/87 |
| 6,694,260 B1* | 2/2004 | Rekow | G01C 21/165 701/472 |
| 2010/0294572 A1 | 11/2010 | Turner | G01G 23/01 177/1 |
| 2012/0325021 A1 | 12/2012 | Nishikawa | G01G 19/18 73/862.193 |
| 2013/0302113 A1 | 11/2013 | Byzewski | G01G 9/00 414/21 |
| 2015/0149064 A1* | 5/2015 | Lim | B60W 10/119 701/110 |
| 2015/0266483 A1 | 9/2015 | Williams | B60L 7/12 701/538 |
| 2021/0070360 A1 | 3/2021 | Lee | B60W 40/09 |

\* cited by examiner

FORCES EXPERIENCED BY ELECTRIC VEHICLE ON
UPWARD SLOPED SURFACE

VEHICLE WITH VEHICLE MASS ESTIMATOR CIRCUIT

VEHICLE MASS ESTIMATOR CIRCUIT

ROAD GRADE ESTIMATOR CIRCUIT

INERTIA ESTIMATOR CIRCUIT
(MODE A)

METHOD OF DETERMINING ROTOR INERTIA FOR A CHASSIS TYPE

FIG. 10 WAVEFORMS DURING OPERATION IN MODE A

FIG. 11 WAVEFORMS DURING OPERATION IN MODE B

REAL-TIME REPORTING AND ESTIMATING OF MASS OF VEHICLES USING DRIVE CHARACTERISTICS

CROSS REFERENCE TO RELATED APPLICATIONS

This application is a continuation of, and claims the benefit under 35 U.S.C. § 120 from, nonprovisional U.S. patent application Ser. No. 16/192,147, entitled "Real-Time Reporting And Estimating Of Mass Of Vehicles Using Drive Characteristics," filed on Nov. 15, 2018. U.S. patent application Ser. No. 16/192,147 claims the benefit under 35 U.S.C. § 119 from U.S. Provisional Patent Application Ser. No. 62/586,886, entitled "Real-Time Reporting And Estimating Of Mass Of Vehicles Using Drive Characteristics," filed on Nov. 15, 2017. The subject matter of each of the foregoing documents is expressly incorporated herein by reference.

TECHNICAL FIELD

The described embodiments relate to electric vehicles, and more particularly to techniques for estimating characteristics related to vehicle control.

BACKGROUND INFORMATION

Electric vehicles are employed in various industries. Lately, electric vehicles have been growing especially popular in industries involving delivery or transport. When electric vehicles are employed in these areas, it is common for payload carried by the electric vehicles to change during operation. For example, a transport vehicle will deliver a large package and the carry weight of the transport vehicle will decrease. Often, it is desirable to know what the present weight of the vehicle is during operation. To determine the weight of the vehicle, the vehicle operator usually drives to a weigh station to ascertain the weight of the vehicle. However, weigh stations are not always readily accessible. Moreover, stopping to weigh the vehicle will often cause delay in delivery and add costs to the entity that owns and operates the vehicle. A more robust solution that overcomes some of these challenges is desirable.

SUMMARY

A technique of reporting and estimating mass of a vehicle during operation of the vehicle involves a collecting method where inertia and mass information of many vehicles of the same type is collected across various operating conditions. For example, for one particular model of vehicles (such as a fleet used for transport), vehicles in the fleet will be driven carrying different known payloads and inertia will be estimated. For each test, the exact weight of the vehicle is measured. Using the mass of the vehicle, the motor angular velocity, the motor torque, and the road slope angle, the total inertia of the vehicle is estimated. The above process is repeated for a statistically significant number of vehicle weights until mass and inertia information is collected and rotor inertia information for the vehicle chassis type is determined.

A vehicle includes a vehicle mass estimator circuit. The vehicle mass estimator circuit accesses the rotor inertia information determined for the vehicle chassis type either through internal storage or by another circuit structure that supplies the rotor inertia information to the vehicle mass estimator circuit during vehicle operation. The vehicle mass estimator circuit is configurable to estimate a mass of vehicle during real-time operation of the vehicle without employing a scale or dedicated mass sensing system. The vehicle mass estimator circuit generates the vehicle mass $M_v$ from: (1) an estimated torque or sensed torque, (2) an estimated motor angular velocity or sensed motor angular velocity, and (3) sensed acceleration or without any sensed acceleration.

In one embodiment, the vehicle mass estimator circuit senses motor current during vehicle operation and estimates a mass of the vehicle using the motor current without any dedicated acceleration sensor such as an accelerometer. A motor angular velocity is estimated from the motor current. In another embodiment, the vehicle mass estimator circuit senses motor current during vehicle operation and estimates a mass of the vehicle using the motor current and acceleration information provided by an accelerometer.

In accordance with one novel aspect, the vehicle mass estimator circuit is operable to detect vehicle mass $M_V$ entirely from sensed motor currents and without resort to any acceleration, position, or torque sensors. This novel technique will be appreciated by those skilled in the art as providing significant cost savings in real-time reporting of commercial transit applications. For example, a commercial transit vehicle equipped with the novel vehicle mass estimator circuit reports real-time mass information of cargo onboard the commercial transit vehicle. In one embodiment, changes in mass due to drop-off or pickup events result in real-time financial charges to entities with cargo on board.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
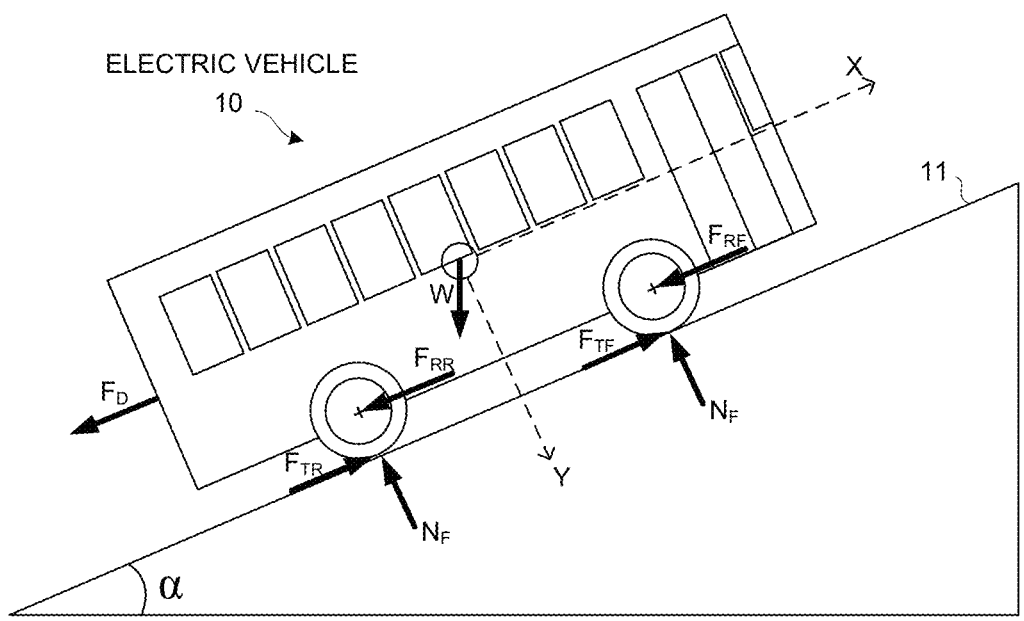
FIG. 1 is a diagram of the forces experienced by an electric vehicle 100 on an upward sloped surface 101.

FIG. 1 is a diagram of the forces experienced by an electric vehicle 100 on an upward sloped surface 101. In this example, the electric vehicle 100 is on the surface 101. The surface 101 is sloped upward at an angle alpha α. A downward force $F_D$ acts on the electric vehicle 100, forcing the vehicle backwards down the upward sloped surface 101. A traction force $F_{TR}$ and a rolling force $F_{RR}$ act upon the rear wheel. A traction force $F_{TF}$ and a rolling force act on the front wheel $F_{RF}$. Normal force $N_F$ opposes gravity and is shown acting on the front wheel and rear wheel. The downward force $F_D$ is a net force that must be overcome to maintain the electric vehicle in a stationary position.

In accordance with one novel aspect, an estimate of vehicle mass is obtained using techniques discussed below. The vehicle mass is useful in providing more robust control of the electric vehicle. In addition, numerous entities desire vehicle mass information of vehicles during vehicle operation.

Longitudinal dynamics of the electric vehicle can be expressed as:

$$M_v \frac{dv_x}{dt} = F_\tau - M_v g_a \sin\alpha - \mu M_v g_a \cos\alpha - \frac{1}{2}\rho C_d A_f v_x^2 \quad (1)$$

where $M_v$ represents vehicle mass, $v_x$ represents longitudinal velocity, $P_T$ represents traction force, α represents grade slope angle, μ represents rolling resistance coefficient, $g_\alpha$ represents gravity acceleration (=9.8 m/s), ρ represents air density, $C_d$ represents drag coefficient, and $A_f$ represents frontal area.

This technique assumes that the electric vehicle has no tire slip, is driving without a braking torque, and has a contact force that does not depend on distribution of forces. Therefore, rotational dynamics of the wheel can be expressed as:

$$J_R \frac{d\omega_w}{dt} = T_W - r_w F_T \quad (2)$$

where $J_R$ represents rotor inertia, $\omega_W$ represents wheel angular velocity, $T_W$ represents wheel torque, and $r_W$ represents wheel (tire) radius. The wheel angular velocity can be determined by:

$$v_x = r_W \omega_W \quad (3)$$

where $r_W$ represents wheel (tire) radius.

Figure 2:
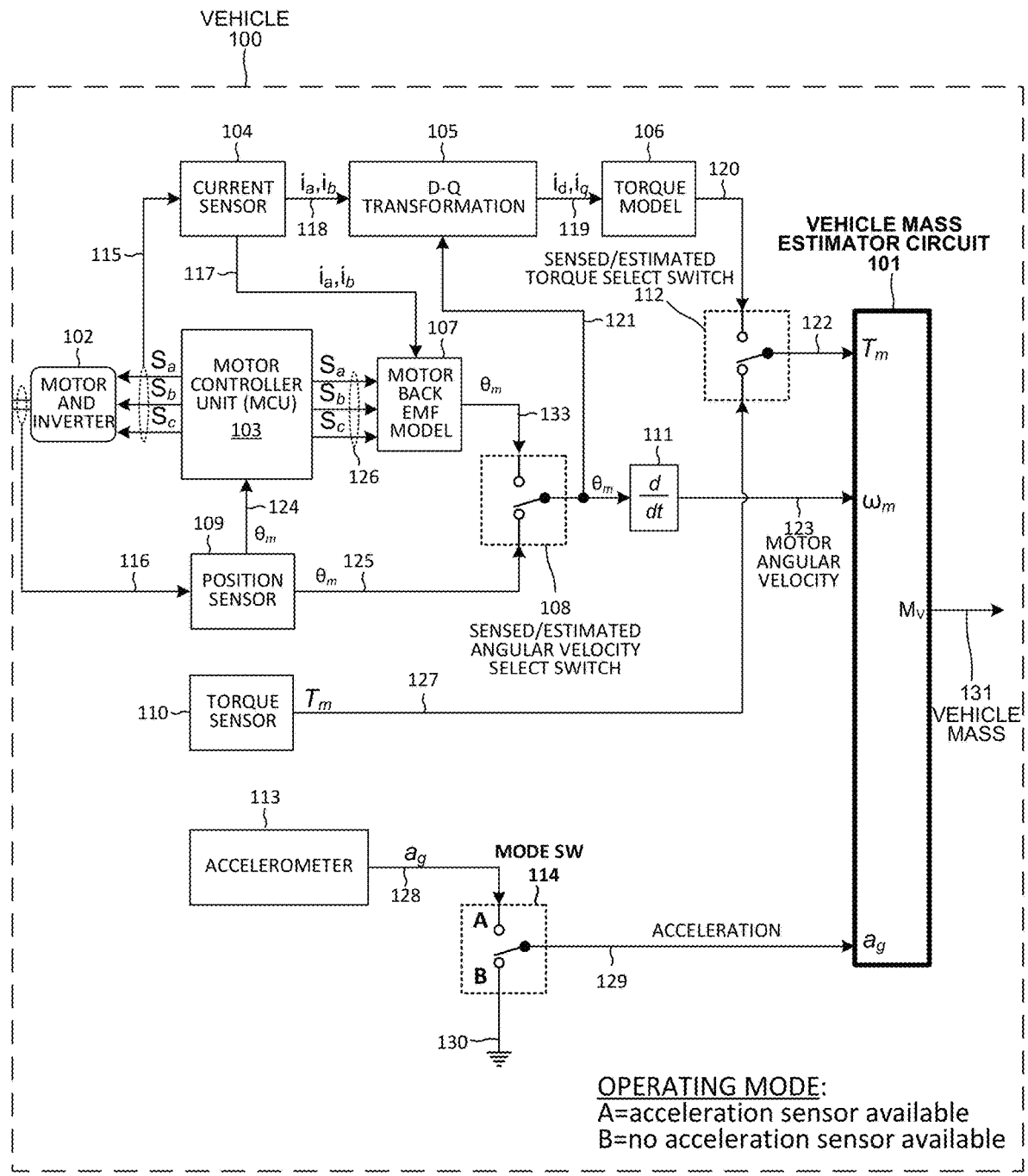
FIG. 2 is a block diagram of a vehicle 100 having a vehicle mass estimator circuit 101.

FIG. 2 is a block diagram of a vehicle 100 having a vehicle mass estimator circuit 101. The vehicle mass estimator circuit 101 is configurable to estimate a mass of vehicle 100 during real-time operation of the vehicle 100 without employing a scale or dedicated mass sensing system. The vehicle 100 comprises the vehicle mass estimator circuit 101, a motor and inverter 102, a motor controller unit (MCU) 103, a current sensor 104, a D-Q transformation circuit 105, a torque model circuit 106, a motor back EMF model 107, a sensed or estimated angular velocity select switch 108, a position sensor 109, a torque sensor 110, a differentiator 111, a sensed or estimated torque select switch 112, an accelerometer 113, and a mode switch 114. The vehicle mass estimator circuit 101 receives a motor torque $T_m$ 122, a motor angular velocity $\omega_m$ 123, and an acceleration $a_g$ 129 and generates a vehicle mass $M_v$ 131.

The vehicle mass estimator circuit 101 generates the vehicle mass $M_v$ 131 from: (1) a sensed torque (involving torque sensor 110) or estimated torque (involving torque model 106), (2) an estimated motor angular velocity (involving motor back EMF model 107) or sensed motor angular velocity (involving position sensor 109), and (3) sensed acceleration in a first mode (Mode A involves accelerometer 113) or no acceleration information (Mode B). The sensed or estimated torque select switch 112 selects between supplying an estimated or detected motor torque $T_m$ to the vehicle mass estimator circuit 101 that is used to generate the vehicle mass $M_v$. The sensed or estimated angular velocity select switch 108 selects between supplying an estimated or measured motor angular velocity $\omega_m$ 123 to the vehicle mass estimator circuit 101 that is used to generate the vehicle mass $M_v$. The mode switch 114 selects between a first mode (Mode A) and a second mode (Mode B). In the first mode (Mode A), an accelerometer 113 detects acceleration 128 of the vehicle 100 and the detected acceleration $a_g$ 129 is supplied to the vehicle mass estimator circuit 101. In the second mode (Mode B), no accelerometer is used to detect acceleration of the vehicle 100 and the acceleration $a_g$ 129 supplied to the vehicle mass estimator circuit 101 is zero. It is understood that the vehicle mass estimator circuit 101 provides more accurate estimates of vehicle mass in Mode A when an accelerometer measures and supplies vehicle acceleration as compared to Mode B where no accelerometer is employed to supply acceleration information to the vehicle mass estimator circuit 101.

During operation, the MCU 103 supplies gating signals $S_A$, $S_B$ and $S_C$ 126 to the motor and inverter 102. In the case where the sensed or estimated torque select switch 112 is set to supply an estimated motor torque 120 to the vehicle mass estimator circuit 101, the current sensor 104 measures motor currents 115 and supplies current signals 118 $i_a$ and $i_b$ to D-Q transformation block 105. The D-Q transformation block 105 also receives angular position 121 $\theta_m$ which is either estimated or sensed. The transformation block 105 in turn generates and supplies direct and quadrature currents 119 $i_d$ and $i_q$ to torque model block 106. The torque model block 106 generates and outputs an estimate of motor torque 120.

In the case where the sensed or estimated torque select switch 112 is set to supply sensed motor torque 127 to the vehicle mass estimator circuit 101, position sensor 109 detects angular position information from motor 102 as indicated by reference numeral 116. The position sensor 109 outputs the angular position $\theta_m$ to the MCU 103 as indicated by reference numeral 124, to the sensed or estimated angular velocity select switch 108 indicated by reference numeral 125. The torque sensor 110 generates and outputs sensed motor torque 127 $T_m$ to the vehicle mass estimator circuit 101.

In the case where the sensed or estimated angular velocity select switch 108 is set to supply estimated motor velocity to the vehicle mass estimator circuit 101, the motor back EMF model block 107 receives the gating signals $S_A$, $S_B$ and $S_C$ as indicated by reference numeral 126. The motor back EMF model block 107 also receives current signals $i_a$ and $i_b$ from current sensor 104 as indicated by reference numeral 117. The motor back EMF model block 107 generates and outputs estimated angular position $\theta_m$ 133 to the sensed or estimated angular velocity select switch 108. Differentiator 111 receives the estimated angular position $\theta_m$ 133 and generates and supplies motor angular velocity $\omega_m$ 123 to the vehicle mass estimator circuit 101.

In the case where the sensed or estimated angular velocity select switch 108 is set to supply sensed motor velocity to the vehicle mass estimator circuit 101, the position sensor 109 detects angular position information from motor 102 as indicated by reference numeral 116 and supplies sensed angular position $\theta_m$ 125 to the sensed or estimated angular velocity select switch 108. Differentiator 111 receives the sensed angular position $\theta_m$ 125 and generates and supplies motor angular velocity $\omega_m$ 123 to the vehicle mass estimator circuit 101.

When an accelerometer is available, the vehicle mass estimator circuit 101 operates in a first mode (Mode A) set by mode switch 114. In the first mode (Mode A), an accelerometer 113 senses acceleration of vehicle 100 and generates acceleration information 128 $a_g$. The acceleration information 128 $a_g$ is supplied to the mode switch 114. The mode switch 114 supplies acceleration 129 to the vehicle mass estimator circuit 101.

When no accelerometer is available, the vehicle mass estimator circuit 101 operates in a second mode (Mode B) set by mode switch 114. In the second mode (Mode B), no accelerometer is used to sense an acceleration of vehicle 100. The mode switch 114 receives a ground signal 130. The mode switch 114 supplies acceleration 129 to the vehicle mass estimator circuit 101 which in the second mode (Mode B) is zero.

Figure 3:
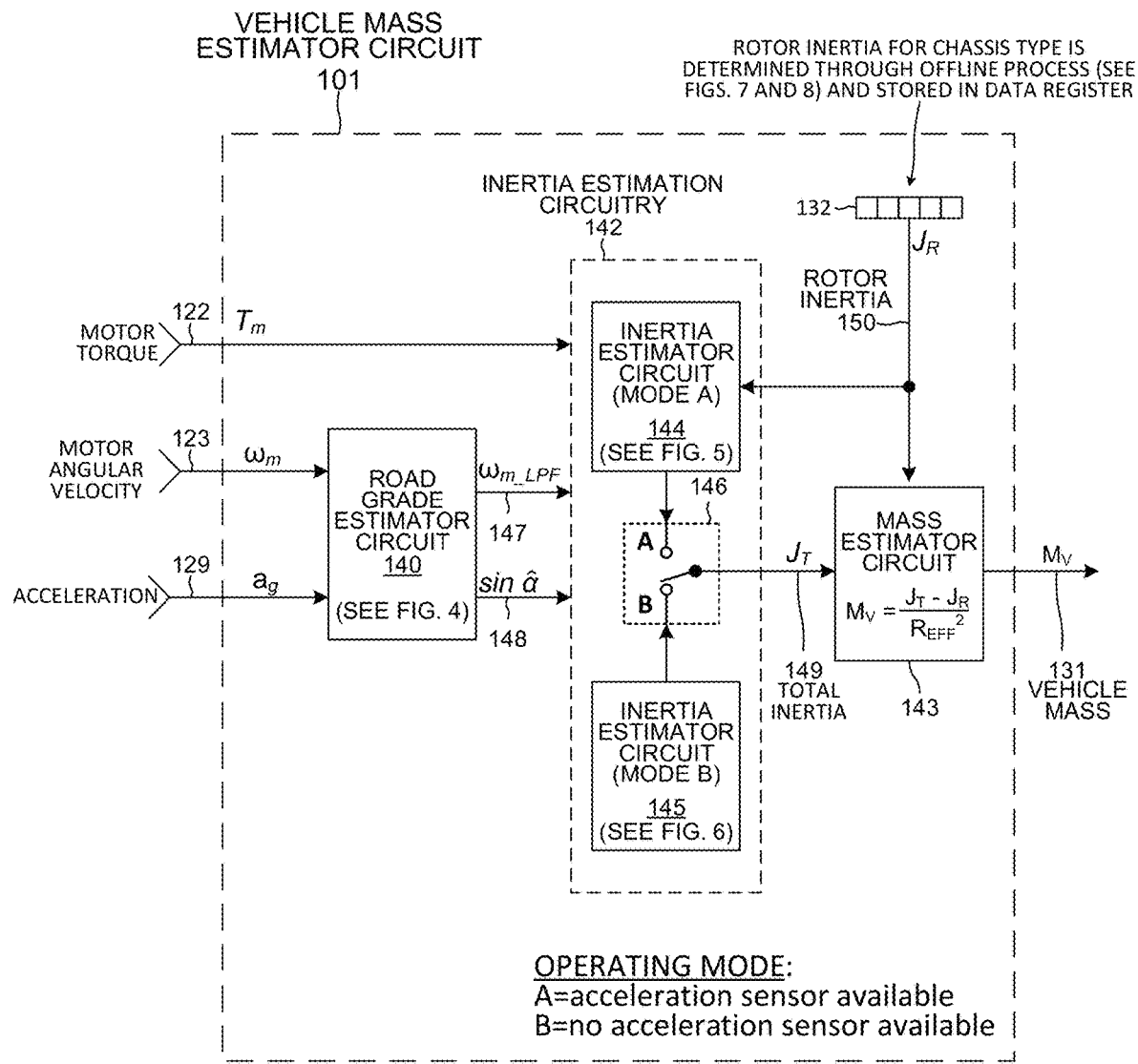
FIG. 3 is a detailed diagram of the vehicle mass estimator circuit 101 shown in FIG. 2.
Figure 4:
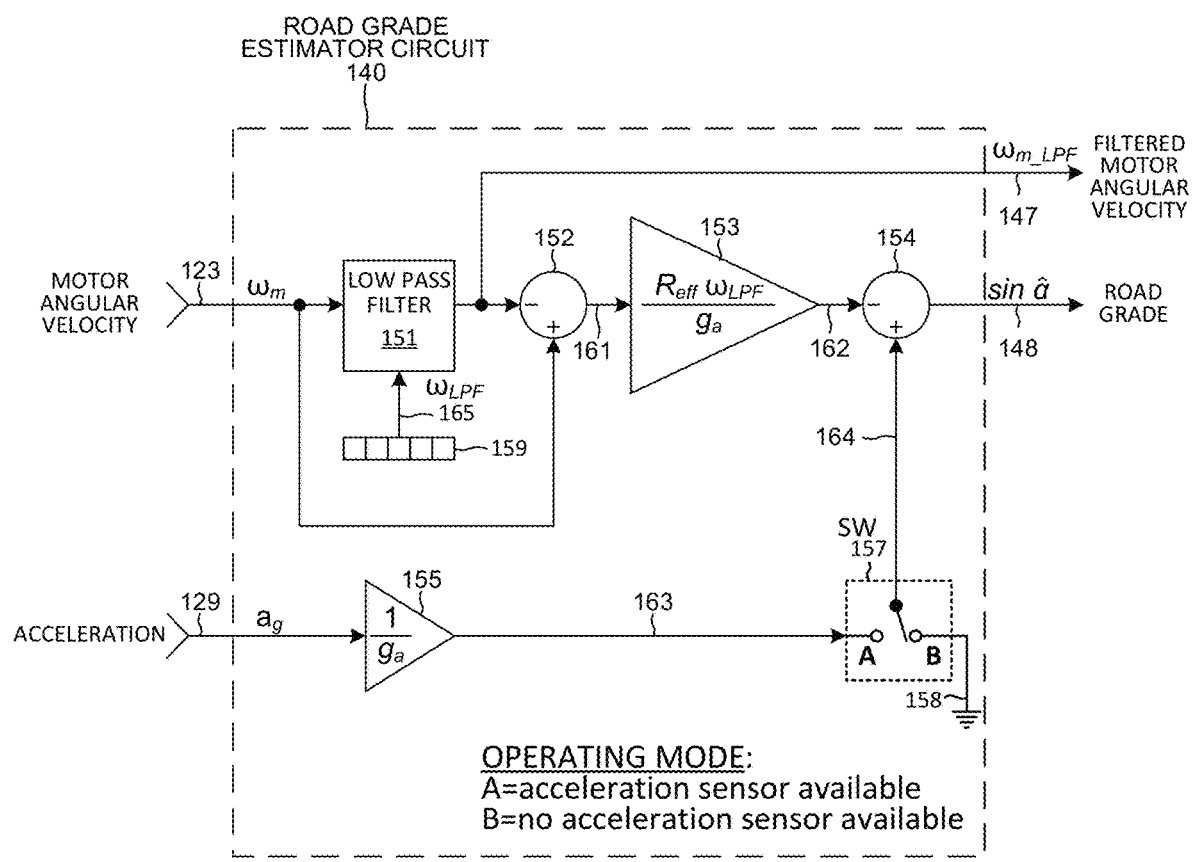
FIG. 4 is a detailed diagram of the road grade estimator circuit 140.

FIG. 3 is a detailed diagram of the vehicle mass estimator circuit 101 shown in FIG. 2. The mass estimator circuit 101 comprises a road grade estimator circuit 140, inertia estimation circuitry 142, mass estimator circuit 143, and data register 132. A detailed diagram of the road grade estimator circuit 140 is shown in FIG. 4. The inertia estimation circuitry 142 comprises an inertia estimator circuit 144 used in Mode A, inertia estimator circuit 145 used in Mode B, and mode select switch 146. The data register 132 stores rotor inertia 150 $J_R$ for a particular chassis type.

During operation, the road grade estimator circuit 140 receives motor angular velocity $\omega_m$ 123 and acceleration $a_g$ 129. The road grade estimator circuit 140 generates and outputs a filtered motor angular velocity $\omega_{m\_LPF}$ 147 and road grade sin $\alpha$ 148 onto inertia estimation circuitry 142. The inertia estimation circuitry 142 also receives rotor inertia $J_R$ 150 that is stored in data register 132 onto the inertia estimator circuit 144 used in Mode A. The inertia estimation circuitry 142 generates total inertia $J_T$ 149 and supplies the total inertia $J_T$ 149 to the mass estimator circuit 143. The mass estimator circuit 143 in turn generates and outputs vehicle mass $M_v$ 131.

Figure 5:
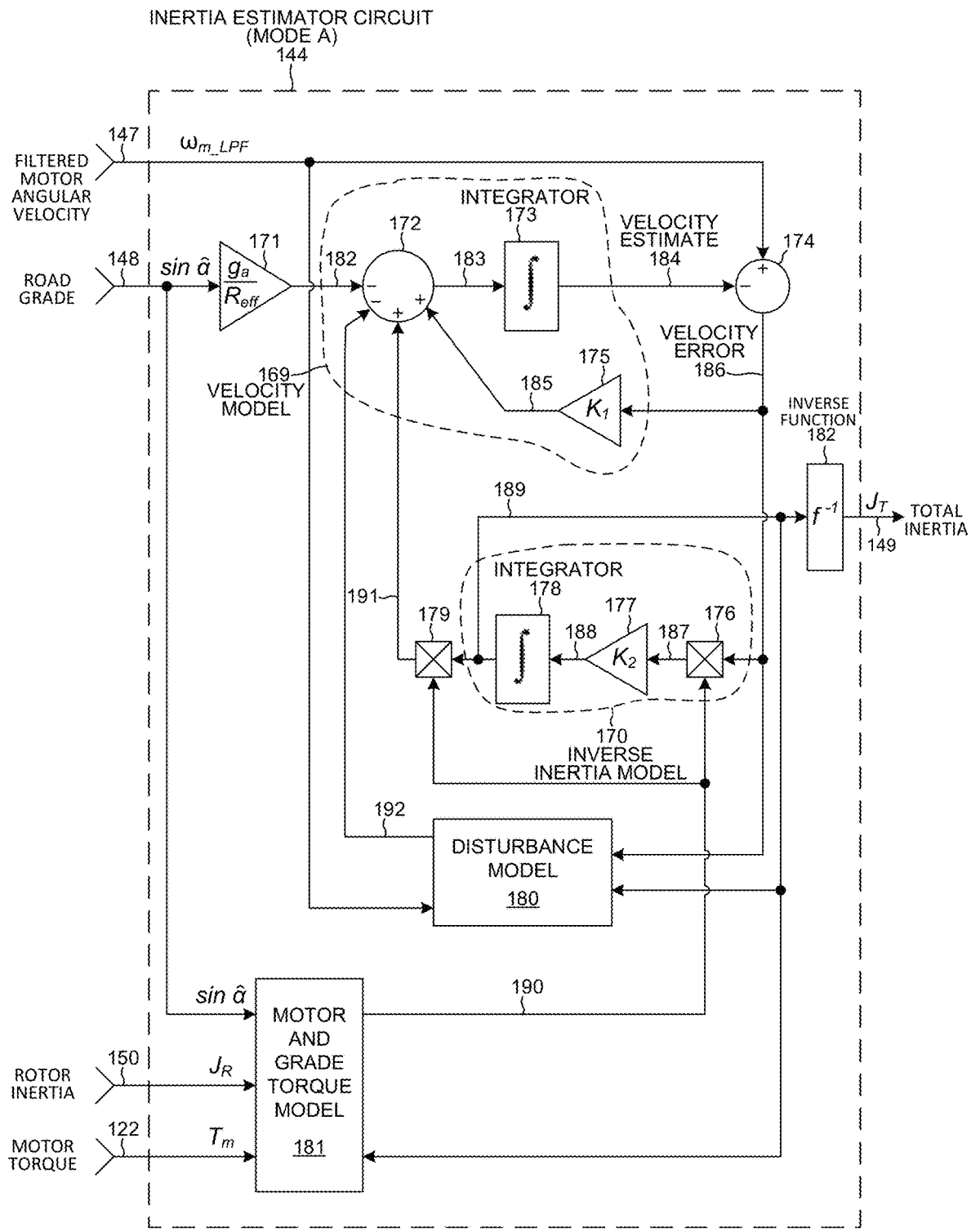
FIG. 5 is a detailed diagram of the inertia estimator circuit 144 when in the first mode (Mode A).
Figure 6:
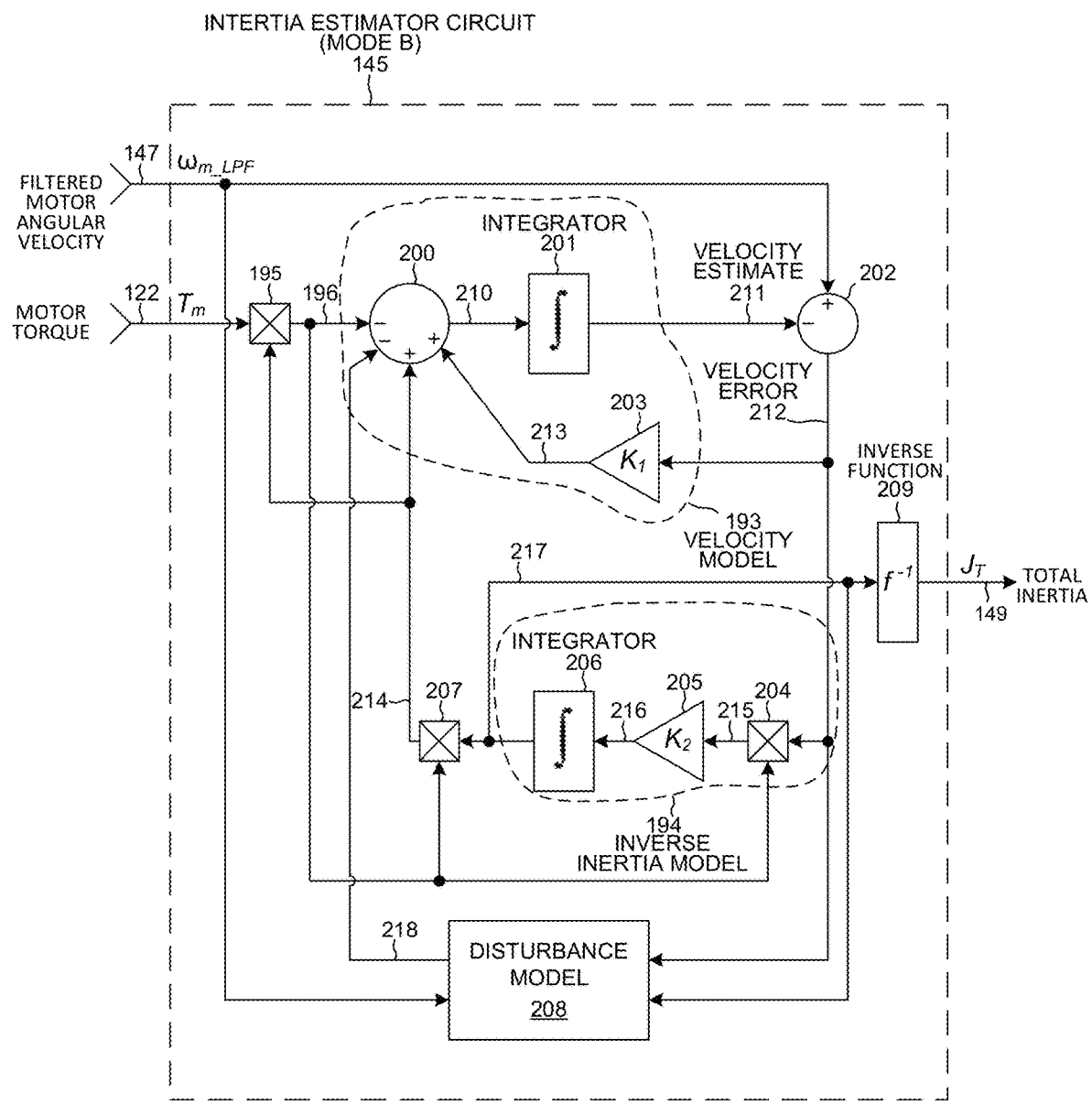
FIG. 6 is a detailed diagram of the inertia estimator circuit 145 when in the second mode (Mode B).

When accelerometer sensing is available, and the vehicle mass estimator circuit is operating in the first mode (Mode A), then mode select switch 146 uses inertia estimator circuit 144 to generate total inertia $J_T$ 149. On the other hand, when no accelerometer sensing is available, and the vehicle mass estimator circuit is operating in the second mode (Mode B), then mode select switch 146 uses inertia estimator circuit 145 to generate total inertia $J_T$ 149. A detailed diagram of inertia estimator circuit 144 is shown in FIG. 5, and a detailed diagram of inertia estimator circuit 145 is shown in FIG. 6.

Figure 7:
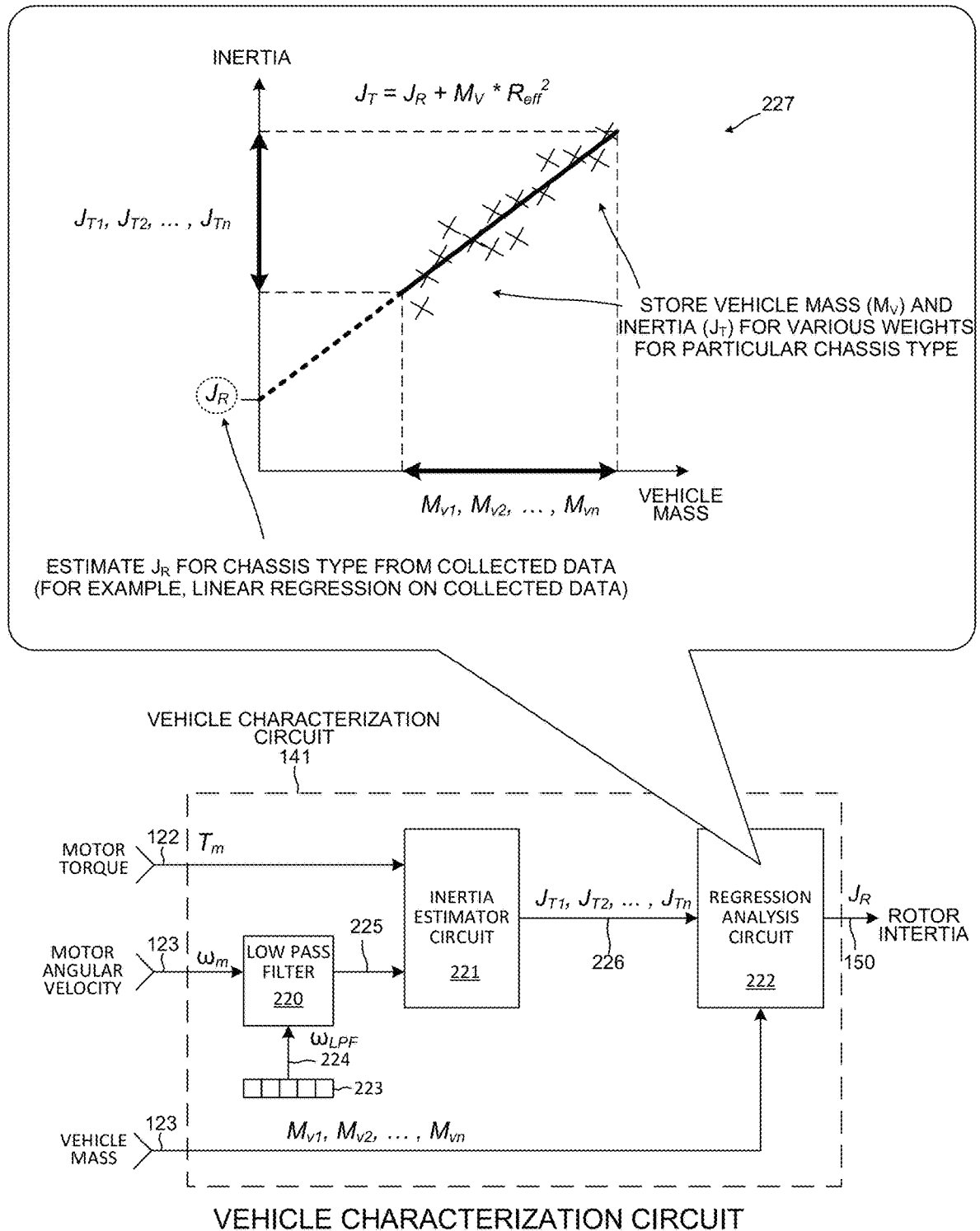
FIG. 7 is a detailed diagram of a vehicle characterization circuit 141.
Figure 8:
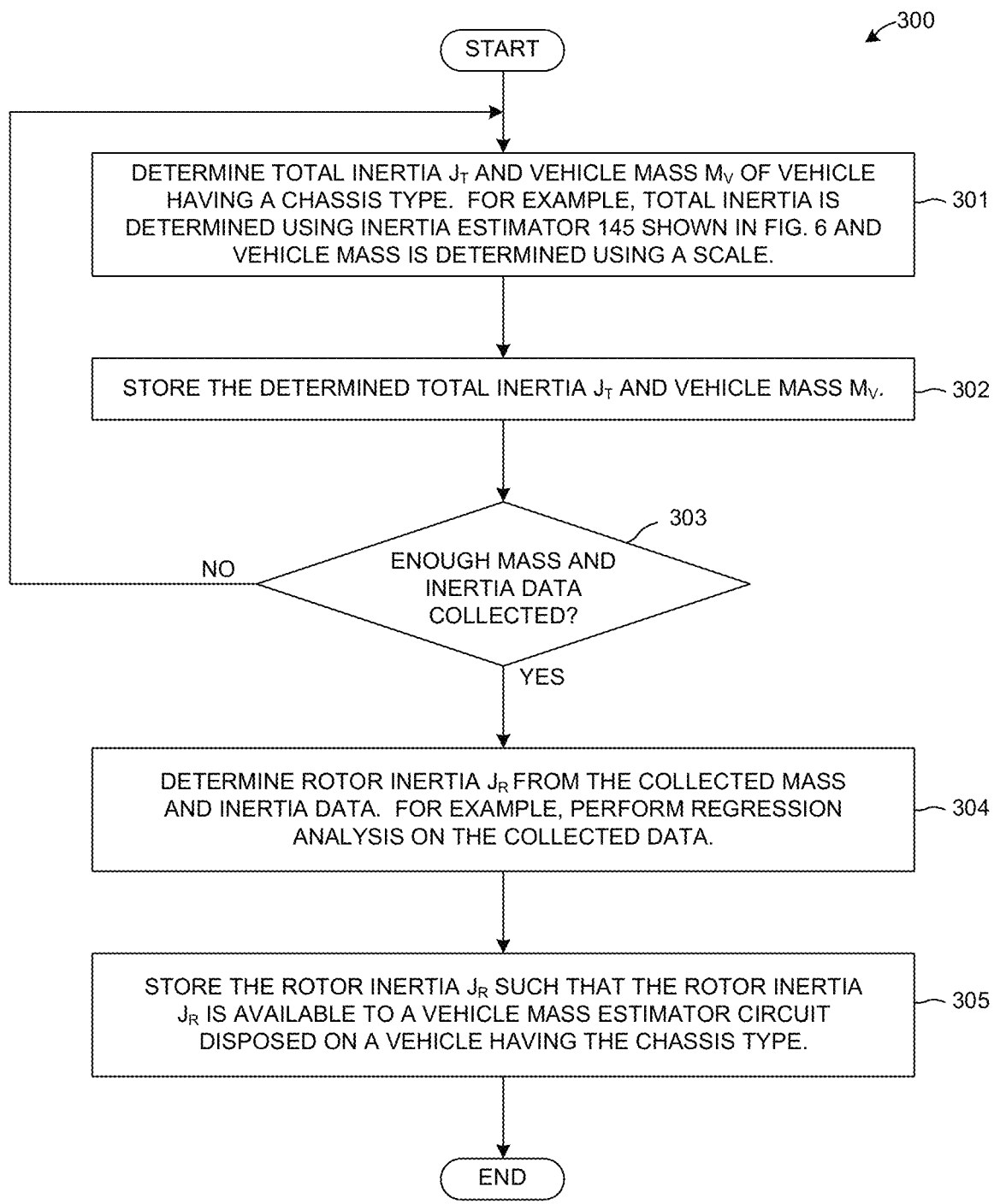
FIG. 8 is a flowchart of a method 300 of determining rotor inertia for a chassis type.

The vehicle mass estimator circuit 101 is configured for a particular vehicle chassis. To operate the vehicle mass estimator circuit 101 on a vehicle, the rotor inertia $J_T$ 150 for the vehicle chassis type is determined before operation of the vehicle mass estimator circuit 101. FIGS. 7 and 8 show how the rotor inertia 150 is obtained for a particular type of vehicle chassis.

To develop road grade estimator circuit 140, a relationship between wheel speed, road grade, and measured acceleration is defined. If the accelerometer is tilted from the horizontal plane by the slope angle $\alpha$, a measured acceleration $a_g$ that the component of gravity is projected onto its measurement axis is given as:

$$a_g = r_w \frac{d\omega_w}{dt} + g_a \sin\alpha \tag{4}$$

Since wheel speed is not directly measured, a relationship must then be defined between motor angular velocity (which is available) and wheel speed. The wheel is coupled to a drivetrain with the motor. Dynamics of the drivetrain can be modeled by a transfer function $G_m(s)$ Therefore, the wheel angular velocity from the motor angular velocity is calculated by:

$$\omega_w = \frac{1}{K_r} G_m(s) \omega_m \tag{5}$$

where $K_r$ represents the gear ratio of drivetrain and where $\omega_m$ represents the motor angular velocity.

$G_m(s)$ is approximated with a first order low pass filter model since the vehicle dynamics is much slower than the powertrain dynamics:

$$G_m(s) \simeq G_{LPF}(s) = \frac{\omega_{LPF}}{s + \omega_{LPF}} \tag{6}$$

where $\omega_{LPF}$ represents the bandwidth.

By combining Eq. (4)-(6), road grade sin a is calculated as follows:

$$\sin\alpha = \frac{a_g}{g_a} - \frac{R_{eff}\omega_{LPF}}{g_a}(1 - G_{LPF}(s))\omega_m \tag{7}$$

where $R_{eff} = r_w/K_r$ represents the effective wheel radius.

FIG. 4 is a detailed diagram of the road grade estimator circuit 140 as derived above in equation (7). The road grade estimator circuit 140 comprises a low pass filter 151, summing elements 152, gain elements 153 and 155, a mode select switch 157, and data register 159. During operation, the road grade estimator circuit 140 receives motor angular velocity $\omega_m$ 123 and acceleration $a_g$ 129 and generates the filtered motor angular velocity $\omega_{m\_LPF}$ 147 and the road grade sin $\alpha$ 148. To generate the filtered motor angular velocity $\omega_{m\_LPF}$ 147, the low pass filter 151 filters the received motor angular velocity $\omega_m$ 123 using a cut off frequency $\omega_{LPF}$ 165 stored in the data register 159 and outputs filtered motor angular velocity $\omega_{m\_LPF}$ 147.

To generate the road grade sin a 148, the summing element 152 determines a difference between the motor angular velocity $\omega_m$ 123 and the filtered motor angular velocity $\omega_{m\_LPF}$ 147. The difference 161 is supplied to gain element 153 which multiplies the difference 161 by $$\frac{R_{eff}\omega_{LPF}}{g_a}.$$

Output 162 of the gain element 153 is supplied to negative input of summing element 154. In the first mode (Mode A), the acceleration 129 is supplied to gain element 155 which divides the acceleration 129 by gravity acceleration $g_a$ and the result 163 is supplied to the summing element 154 via mode select switch 157. In the second mode (Mode B), mode select switch 157 is coupled to ground node 158 and a zero value is supplied to the summing element 154.

To develop an inertia estimator circuit for the first mode (Mode A) 144 in FIG. 5, which is a technique to determine total inertia $J_T$ from filtered motor angular velocity, road grade, rotor inertia, and motor torque is required. Considering slow dynamics of the drivetrain with the motor in Eqs. (5) and (6), the wheel torque and angular velocity are:

$$\omega_w = \frac{1}{K_r}\omega_{m\_LPF}, \text{ and } T_w = K_r T_m \quad (8)$$

where $\omega_{m\_LPF}$ represents the filtered motor angular velocity. Total inertia, $J_T$, and the vehicle mass, $M_v$, are defined as:

$$J_T = J_R + M_v R_{eff}^2, \text{ and } M_v = \frac{J_T - J_R}{R_{eff}^2} \quad (9)$$

where $R_{eff} = r_w/K_r$ represents the effective wheel radius.

From Eqs. (1)-(3), (8) and (9), equivalent dynamics from the motor to the vehicle can be represented as:

$$\frac{d\omega_{m\_LPF}}{dt} = -\frac{g_a}{R_{eff}}\sin\alpha - \frac{1}{J_T}T_{mg}(J_R, T_m, \sin\alpha) - W_A\left(\frac{1}{J_T}, \omega_{m\_LPF}\right) \quad (10)$$

where $T_{mg}(J_R T_m, \sin\alpha)$ represents the motor and grade torque model, and $$W_A\left(\frac{1}{J_T}, \omega_{m\_LPF}\right)$$

represents the disturbance model. The motor and grade torque model, and the disturbance model can be calculated with the known parameters of the drivetrain. Then, the state space model from Eq. (10) is given as:

$$\begin{cases} \frac{dx_1}{dt} = -\frac{g_a}{R_{eff}}u - x_2 T_{mg}(J_R, T_m, \sin\alpha) - W_A(x_1, x_2) \\ \frac{dx_2}{dt} = 0 \end{cases} \quad (11)$$

where $x_1 = \omega_{m\_LPF}, x_2 = \frac{1}{J_T}, u = \sin\alpha$.

This technique uses a state estimator. In control theory, a state estimator is an algorithm that estimates the internal state variables of the state space model of the real system from the measured input and output through physical sensors. The state estimator is generally implemented with a differential equation as follows:

$$\begin{cases} \frac{d\hat{x}_1}{dt} = \\ -\frac{g_a}{R_{eff}}u - \hat{x}_2 T_{mg}(J_R, T_m, \sin\alpha) - W_A(x_1, x_1 - \hat{x}_1, \hat{x}_2) + K_1(x_1 - \hat{x}_1) \\ \frac{d\hat{x}_2}{dt} = K_2 T_{mg}(J_R, T_m, \sin\alpha)(x_1 - \hat{x}_1) \end{cases} \quad (12)$$

where $K_1$, $K_2$ represent estimator gains.

FIG. 5 is a detailed diagram of the inertia estimator circuit 144 when in the first mode (Mode A), as derived above in equation (12). The inertia estimator circuit 144 comprises velocity model circuitry 169, inverse inertia model circuitry 170, gain element 171, summing element 174, disturbance model circuitry 180, motor and grade torque model circuitry 181, and inverse function block 182. The velocity model circuitry 169 comprises a summing element 172, an integrator 173, and gain element 175. The inverse inertia model circuitry 170 comprises multiplier elements 176 and 179, a gain element 177 and integrator 178. During operation, the inertia estimator circuit 144 receives the filtered motor angular velocity $\omega_{m\_LPF}$ 147, the road grade sin α 148, the rotor inertia $J_R$ 150, and the motor torque $T_m$ 122. The inertia estimator circuit 144 generates and outputs total inertia $J_T$ 149.

The summing element 174 detects a velocity error 186 by detecting a difference between the filtered motor angular velocity $\omega_{m\_LPF}$ 147 and a velocity estimate 184 generated by the velocity model circuitry 169. The velocity error 186 is fed back to the velocity model circuitry 169 and the velocity error 186 is also supplied to the disturbance model circuitry 180. The velocity model circuitry 169 generates the velocity estimate 184 by receiving output 182 of gain element 171 onto a negative input of the summing element 172, by receiving output 192 onto another negative input of the summing element 172, by receiving result 191 onto a positive input of the summing element 172, and by receiving output 185 of gain element 175 onto another positive input of the summing element 172. The output 183 of the summing element 172 is supplied to integrator 173 which in turn generates the velocity estimate 184.

The inverse inertia model circuitry 170 receives the velocity error 186 and output 190 of the motor and grade torque model 181 and generates inverse inertia 189. The inverse inertia 189 is supplied to inverse function 182 to obtain total inertia $J_T$ 149. The velocity error 186 and output 190 of the motor and grade torque model 181 are multiplied together by multiplier 176. Result 187 is supplied to gain element 177 which outputs 188 to the integrator 178. Multiplier 179 multiplies output 189 of the integrator 178 with output 190 of the motor and grade torque model 181 and supplies result 191 to a positive input of the summing element 172.

If the acceleration is not measured (mode B), the inertia estimator circuit 145 in FIG. 6 can be derived by re-organizing the state space model in Eq. (12) as $$\begin{cases} \frac{dx_1}{dt} = x_2 u - W_B(x_1, x_2) \\ \frac{dx_2}{dt} = 0 \end{cases} \quad (13)$$

where $x_1 = \omega_{m\_LPF}, x_2 = \frac{1}{J_T}, u = T_m, W_B\left(\frac{1}{J_T}, \omega_m\right)$ represents the disturbance model.

The disturbance model includes the variations of the road grade and the known parameters of the drivetrain. An implemented differential equation for the state estimator is shown as follows:

$$\begin{cases} \dfrac{d\hat{x}_1}{dt} = \hat{x}_2 u - W_B(x_1, x_1 - \hat{x}_1, \hat{x}_2) + K_1(x_1 - \hat{x}_1) \\ \dfrac{d\hat{x}_2}{dt} = K_2(x_1 - \hat{x}_1)u \end{cases} \quad (14)$$

where $K_1$, $K_2$ are estimator gains.

FIG. 6 is a detailed diagram of the inertia estimator circuit 145 when in the second mode (Mode B), as derived above in equation (14). The inertia estimator circuit 145 comprises velocity model circuitry 193, inverse inertia model circuitry 194, multiplier 195, summing element 202, disturbance model circuitry 208, and inverse function block 209. The velocity model circuitry 193 comprises a summing element 200, an integrator 201, and gain element 203. The inverse inertia model circuitry 194 comprises multiplier elements 204 and 207, a gain element 205, and integrator 206. During operation, the inertia estimator circuit 145 receives the filtered motor angular velocity $\omega_{m\_LPF}$ 147 and the motor torque $T_m$ 122. The inertia estimator circuit 145 generates and outputs total inertia $J_T$ 149.

The summing element 202 detects a velocity error 212 by detecting a difference between the filtered motor angular velocity $\omega_{m\_LPF}$ 147 and a velocity estimate 211 generated by the velocity model circuitry 193. The velocity error 212 is fed back to the velocity model circuitry 193 and the velocity error 212 is also supplied to the disturbance model circuitry 208. The velocity model circuitry 193 generates the velocity estimate 211 by receiving output 196 of multiplier 195 onto a negative input of the summing element 200, by receiving output 218 onto another negative input of the summing element 200, by receiving output 214 onto a positive input of the summing element 200, and output 213 of gain element 203 onto another positive input of the summing element 200. The output 210 of the summing element 200 is supplied to integrator 201 which in turn generates the velocity estimate 211.

The inverse inertia model circuitry 194 receives the velocity error 212 and output 196 of multiplier 195 and generates inverse inertia 217. The inverse inertia 217 is supplied to inverse function 209 to obtain total inertia $J_T$ 149. The velocity error 212 and output 196 of multiplier 195 are multiplied together by multiplier 204. Result 215 is supplied to gain element 205 which outputs 216 to the integrator 206. Multiplier 207 multiplies the inverse inertia 217 with output 196 of multiplier 195 and supplies the result 214 to a positive input of the summing element 200.

FIG. 7 is a detailed diagram of a vehicle characterization circuit 141. The vehicle characterization circuit 141 is used to determine a rotor inertia $J_R$ 150 for a particular type of vehicle chassis. The vehicle characterization circuit 141 comprises a low pass filter 220, an inertia estimator circuit 221, a regression analysis circuit 222, and data register 223. The data register 223 stores cut off frequency $\omega_{LPF}$ 224 used by the low pass filter 220. To determine the rotor inertia $J_R$ 150 of a particular chassis, vehicle mass and total inertia data is collected. Regression analysis is performed on the collected data to obtain the rotor inertia $J_R$ 150 of the specific chassis type. Reference numeral 227 identifies the regression analysis performed by the regression analysis circuit 222 on the collected mass and inertia information.

Each mass and inertia sample is obtained by supplying a filtered motor angular velocity 225 and the motor torque 122 $T_m$ to the inertia estimator circuit 221. In this example, the inertia estimator circuit 221 is the same as the inertia estimator circuit 145 shown in FIG. 6. The inertia estimator circuit 221 generates and outputs total inertia $J_T$ 226. Vehicle mass 123 is obtained using a scale to weigh the vehicle. Once sufficient data points are collected, the regression analysis circuit 222 estimates the rotor inertia $J_R$ 150 for the specific type of vehicle chassis.

FIG. 8 is a flowchart of a method 300 of determining rotor inertia for a chassis type. In a first step (step 301), total inertia $J_T$ and vehicle mass $M_v$ of a vehicle having a chassis type is determined. For example, total inertia is determined using inertia estimator 145 shown in FIG. 6 and vehicle mass is determined using a scale.

In a second step (step 302), the total inertia $J_T$ and vehicle mass $M_v$ of the vehicle are stored.

In a third step (step 303), a determination is made as to whether enough mass and inertia data has been collected for the specific type of chassis. If it is not determined that sufficient data has been collected, then the method proceeds to step 301. If, on the other hand, it is determined that sufficient mass and inertia data has been collected for the specific type of chassis, then the method proceeds to step 304.

In a fourth step (step 304), rotor inertia $J_R$ is determined from the collected mass and inertia data. For example, regression analysis is performed on the collected data as shown in FIG. 7.

In a fifth step (step 305), the rotor inertia $J_R$ is stored such that the rotor inertia $J_R$ is available to a vehicle mass estimator circuit disposed on a vehicle having the chassis type determined from the collected mass and inertia data. For example, in FIG. 3, the rotor inertia 150 is stored in data register 132 of the vehicle mass estimator circuit 101. The vehicle mass estimator circuit 101 uses the stored rotor inertia $J_R$ to determine vehicle mass.

Figure 9:
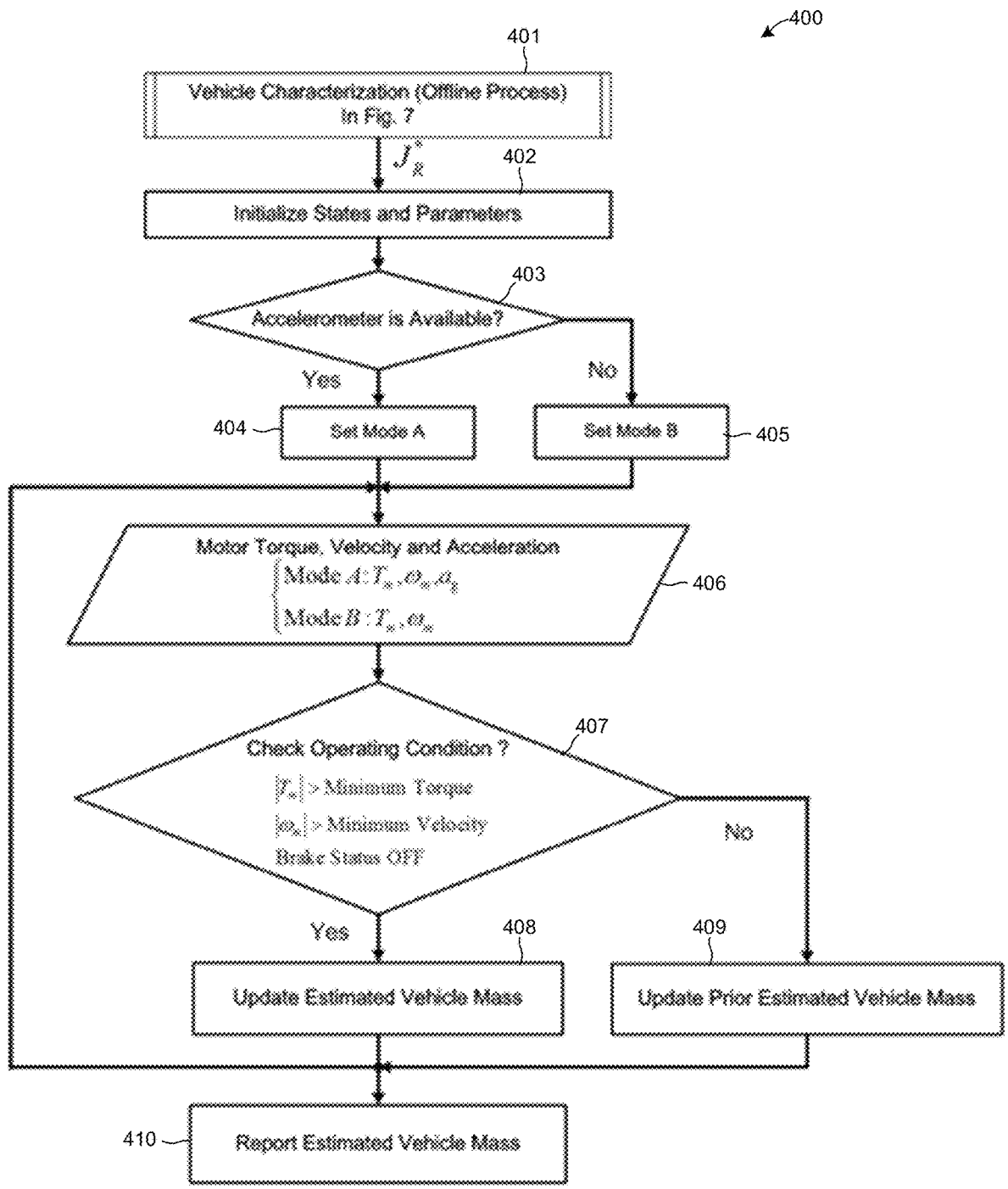
FIG. 9 is a flowchart of a method 400 in accordance with one novel aspect.

FIG. 9 is a flowchart of a method 400 in accordance with one novel aspect. Method 400 is a technique of estimating vehicle mass $M_v$. In a first step (step 401), a vehicle characterization process is performed to obtain a rotor inertia $J_R$ for a particular vehicle chassis.

In a second step (step 402), states and parameters are initialized.

In a third step (step 403), a determination is made as to whether acceleration sensing is available. If it is determined that acceleration sensing is available, then the method proceeds to step 404. For example, in FIG. 3, when acceleration sensing is available, then the vehicle mass estimator circuit 101 operates in Mode A and the inertia estimation circuitry 142 uses inertia estimator circuit 144. If, on the other hand, it is determined that no acceleration sensing is available, then the method proceeds to step 405. For example, in FIG. 3, when no accelerometer is available, then the vehicle mass estimator circuit 101 operates in Mode B and the inertia estimation circuitry 142 uses inertia estimator circuit 145.

In a sixth step (step 406), operating characteristics are obtained, such as motor torque, velocity, and acceleration if available.

In a seventh step (step 407), a determination is made as to whether operating conditions are satisfied. The operating conditions are that the motor torque is above a minimum torque, motor velocity is above a minimum velocity, and that brakes are OFF. This condition is checked to determine whether the estimator has sufficient information to update the vehicle mass estimate. If the operating conditions are satisfied, then the method proceeds to an eighth step (step 408) where vehicle mass is estimated and then updated to represent this estimation. On the other hand, if the operating conditions are not satisfied, then the method proceeds to a ninth step (step 409) where vehicle mass is updated with the prior estimated vehicle mass. In a tenth step (step 410), the vehicle mass $M_v$ is output.

Figure 10:
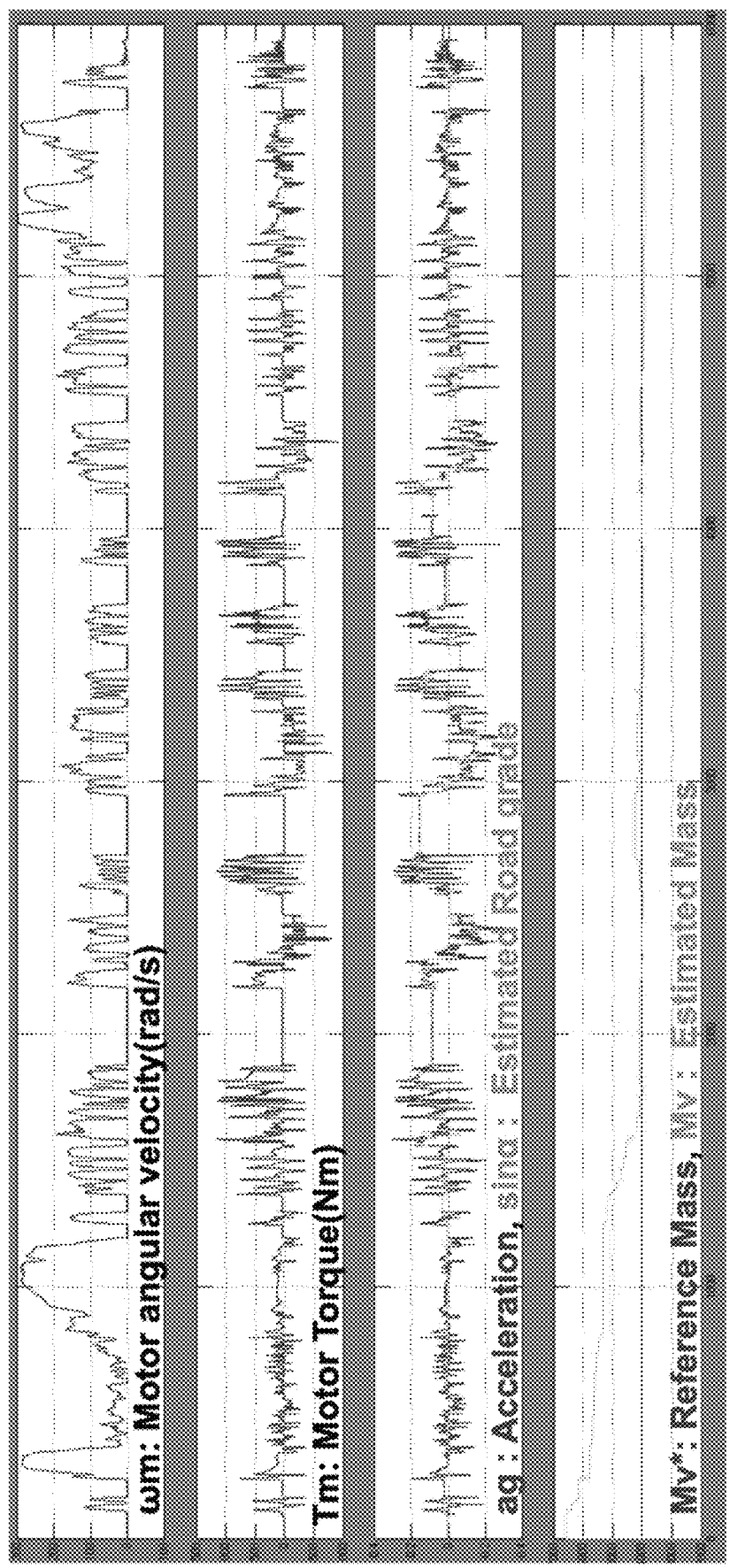
FIG. 10 shows waveform diagrams during operation of the vehicle mass estimator circuit 101 in Mode A.

FIG. 10 shows waveform diagrams during operation of the vehicle mass estimator circuit 101 in Mode A. The bottom waveform shows the vehicle mass estimate achieved by the novel vehicle mass estimator circuit 101 as well as the reference mass.

Figure 11:
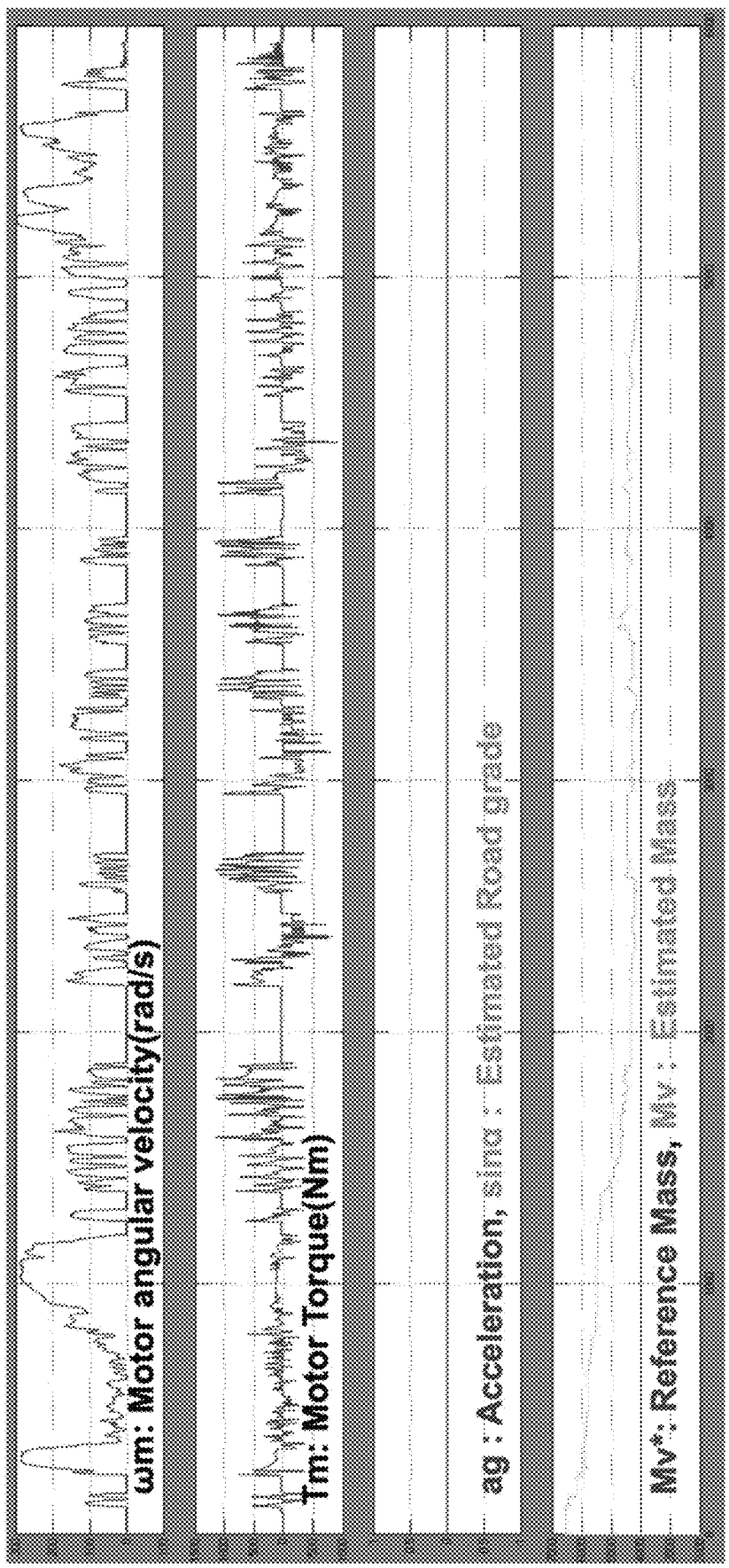
FIG. 11 shows waveform diagrams during operation of the vehicle mass estimator circuit 101 in Mode B.

FIG. 11 shows waveform diagrams during operation of the vehicle mass estimator circuit 101 in Mode B. The bottom waveform shows the vehicle mass estimate achieved by the novel vehicle mass estimator circuit 101 as well as the reference mass. Comparing operation of the vehicle mass estimator circuit 101 in Mode A shown in FIG. 10 versus Mode B shown in FIG. 11 indicates that the vehicle mass estimator circuit 101 achieves a more accurate estimate of vehicle mass in a shorter period of time in Mode A as compared to Mode B.

Figure 12:
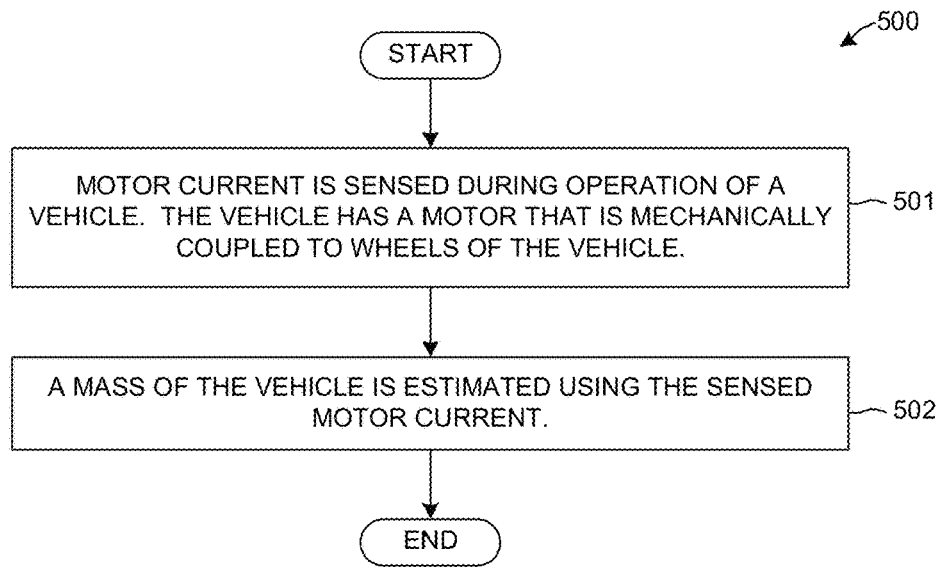
FIG. 12 is a flowchart of a method 500 in accordance with novel aspect.

FIG. 12 is a flowchart of a method 500 in accordance with novel aspect. In a first step (step 501), a motor current is sensed during operation of a vehicle. The vehicle has a motor that is mechanically coupled to wheels of the vehicle. In a second step (502), a mass of the vehicle is estimated using the sensed motor current.

Figure 13:
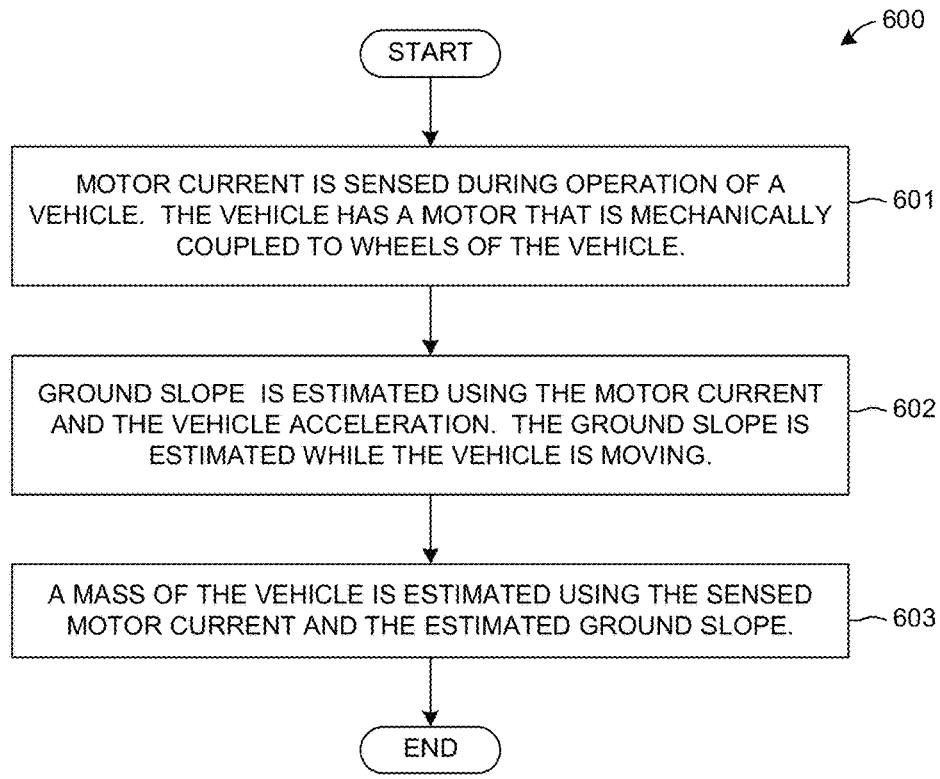
FIG. 13 is a flowchart of a method 600 in accordance with another novel aspect.

FIG. 13 is a flowchart of a method 600 in accordance with another novel aspect. In a first step (step 601), a motor current is sensed during operation of a vehicle. The vehicle has a motor that is mechanically coupled to wheels of the vehicle. In a second step (602), ground slope is estimated using the motor current and the vehicle acceleration. The ground slope is estimated while the vehicle is moving. In a third step (603), a mass of the vehicle is estimated using the sensed motor current and the estimated ground slope.

Although certain specific exemplary embodiments are described above in order to illustrate the invention, the invention is not limited to the specific embodiments. For example, although the vehicle 100 of FIG. 2 shows position sensor 109, torque sensor 110, and accelerometer 113 it is understood that each or all of the position sensor 109, torque sensor 110, and accelerometer 113 can be selectively omitted across various embodiments and the vehicle mass estimator circuit 101 will still be able to detect vehicle mass $M_v$ 131 as long as the vehicle is moving at a sufficient speed. The vehicle mass estimator circuit 101 is operable to detect vehicle mass $M_v$ 131 entirely from sensed motor currents and without resort to any acceleration, position, or torque sensors. Accordingly, various modifications, adaptations, and combinations of various features of the described embodiments can be practiced without departing from the scope of the invention as set forth in the claims.

What is claimed is:

1. A method comprising:
sensing motor current during operation of a vehicle, wherein the vehicle has a motor mechanically coupled to wheels of the vehicle;
estimating ground slope using the motor current and vehicle acceleration, wherein the ground slope is estimated while the vehicle is moving; and
estimating a mass of the vehicle using the motor current and the ground slope.

2. The method of claim 1, further comprising:
determining motor angular velocity, wherein the motor angular velocity is used in estimating the mass of the vehicle.

3. The method of claim 2, wherein the motor angular velocity is determined from the motor current sensed during operation of the vehicle.

4. The method of claim 2, wherein the motor angular velocity is determined using a sensor.

5. The method of claim 1, further comprising:
sensing vehicle acceleration, wherein the vehicle acceleration is used in estimating the mass of the vehicle.

6. The method of claim 5, wherein the vehicle acceleration is sensed using a vehicle acceleration sensor.

7. The method of claim 1, wherein no wheel speed sensor is needed in estimating the mass of the vehicle.

8. The method of claim 1, wherein no torque sensor is needed in estimating the mass of the vehicle.

9. A vehicle comprising:
a motor current sensor configured to sense motor current of a motor coupled to drive a wheel of the vehicle; and
a controller configured to generate a vehicle mass estimation using the motor current and a ground slope, wherein the controller is also configured to estimate the ground slope using the motor current and vehicle acceleration, and wherein the vehicle acceleration is sensed while the vehicle is moving.

10. The vehicle of claim 9, wherein the motor current sensor is coupled in series with a winding of the motor.

11. The vehicle of claim 9, wherein the motor current sensor is taken from the group consisting of: a hall effect current sensor, a resistive shunt, and a current sense circuit.

12. The vehicle of claim 9, further comprising:
a motor angular velocity sensor.

13. The vehicle of claim 12, wherein the motor angular velocity sensor is an encoder or a resolver.

14. The vehicle of claim 9, wherein the controller is configured to generate the vehicle mass estimation without needing motor angular velocity information sensed by a dedicated motor angular velocity sensor.

15. The vehicle of claim 9, further comprising:
a vehicle acceleration sensor configured to sense the vehicle acceleration.

16. The vehicle of claim 9, wherein the controller is configured to generate the vehicle mass estimation without needing any wheel speed sensor.

17. A vehicle comprising:
a motor current sensor adapted to sense motor current of a motor coupled to drive a wheel of the vehicle; and
means for generating a vehicle mass estimation using the motor current and a ground slope, wherein the means is also for estimating the ground slope using the motor current and vehicle acceleration, and wherein the vehicle acceleration is sensed while the vehicle is moving.

18. The vehicle of claim 17, wherein the means is a vehicle mass estimator circuit.

19. The vehicle of claim 17, wherein the means generates the vehicle mass estimation without needing a wheel speed sensor or dedicated motor angular velocity sensor.

20. The vehicle of claim 17, wherein the motor current sensor is coupled in series with a winding of the motor, and wherein the motor current sensor is taken from the group consisting of: a hall effect current sensor, a resistive shunt, and a current sense circuit.

* * * * *